(12) United States Patent
Arjakine et al.

(10) Patent No.: US 8,866,042 B2
(45) Date of Patent: Oct. 21, 2014

(54) WELDING METHOD AND COMPONENT

(75) Inventors: Nikolai Arjakine, Berlin (DE); Georg Bostanjoglo, Berlin (DE); Bernd Burbaum, Falkensee (DE); Andres Gasser, Aachen (DE); Torsten Jambor, Köln (DE); Stefanie Linnenbrink, Kreuzau (DE); Torsten Melzer-Jokisch, Neuenhagen bei Berlin (DE); Michael Ott, Mülheim an der Ruhr (DE); Norbert Pirch, Aachen (DE); Rolf Wilkenhöner, Kleinmachnow (DE)

(73) Assignees: Siemens Aktiengesellschaft, München (DE); Fraunhofer Gesellschaft zur Förderung der angewandten Forschung e.V., München (DE)

( * ) Notice: Subject to any disclaimer, the term of this patent is extended or adjusted under 35 U.S.C. 154(b) by 452 days.

(21) Appl. No.: 13/262,084

(22) PCT Filed: Mar. 31, 2010

(86) PCT No.: PCT/EP2010/054322
§ 371 (c)(1),
(2), (4) Date: Jan. 16, 2012

(87) PCT Pub. No.: WO2010/112553
PCT Pub. Date: Oct. 7, 2010

(65) Prior Publication Data
US 2012/0103950 A1 May 3, 2012

(30) Foreign Application Priority Data

Apr. 3, 2009 (DE) .......................... 10 2009 016 260

(51) Int. Cl.
*B23K 26/34* (2014.01)
*B23K 9/04* (2006.01)
*F01D 5/00* (2006.01)
*B23K 15/00* (2006.01)
*B23P 6/00* (2006.01)
*C21D 9/50* (2006.01)
*B23K 10/02* (2006.01)
*F01D 5/28* (2006.01)

(52) U.S. Cl.
CPC . *B23K 26/34* (2013.01); *B23K 9/04* (2013.01); *F05D 2230/312* (2013.01); *F01D 5/005* (2013.01); *C21D 2251/04* (2013.01); *B23K 2201/001* (2013.01); *F05D 2230/31* (2013.01); *B23K 15/0086* (2013.01); *B23P 6/007* (2013.01); *C21D 9/50* (2013.01); *Y02T 50/67* (2013.01); *F05D 2230/232* (2013.01); *Y02T 50/673* (2013.01); *B23K 10/027* (2013.01); *F01D 5/288* (2013.01)
USPC ..................................................... 219/121.64

(58) Field of Classification Search
CPC ........ B23K 9/04; B23K 26/34; B23K 26/345; B23K 31/02
USPC ........... 219/121.63, 121.64, 121.85; 228/119, 228/199, 225; 29/888.011–888.42, 889.1, 29/895.1, 897.1
See application file for complete search history.

(56) References Cited

U.S. PATENT DOCUMENTS

| 5,060,842 A | 10/1991 | Qureshi et al. |
| 6,024,792 A | 2/2000 | Kurz et al. |

(Continued)

FOREIGN PATENT DOCUMENTS

| CN | 1322892 A | 11/2001 |
| CN | 1883872 A | 12/2006 |

(Continued)

*Primary Examiner* — Samuel M Heinrich (57) ABSTRACT

A process for welding a component in which a recess is filled by welding tracks is provided. The process includes providing a recess with a contour which delimits an outer upper surface of the component with respect to the recess. The welding tracks are laid such that the welding tracks also reach the surface outside a contour of the recess and that a plurality of welding layers are used in order to fill the recess until a last layer protrudes completely beyond the surface.

12 Claims, 6 Drawing Sheets

(56) References Cited

U.S. PATENT DOCUMENTS

| | | |
|---|---|---|
| 6,436,553 B1 | 8/2002 | Stadler et al. |
| 2002/0125216 A1 | 9/2002 | Sauron et al. |
| 2002/0130112 A1* | 9/2002 | Manasas et al. ......... 219/121.64 |
| 2004/0191064 A1 | 9/2004 | Guo |
| 2005/0109818 A1 | 5/2005 | Katayama |
| 2006/0193612 A1* | 8/2006 | Bouet et al. .................. 392/408 |
| 2007/0119830 A1 | 5/2007 | Meier |

FOREIGN PATENT DOCUMENTS

| | | |
|---|---|---|
| DE | 69420453 T2 | 4/2000 |
| DE | 102007034242 A1 | 4/2009 |
| EP | 0486489 B1 | 11/1994 |
| EP | 0412397 B1 | 3/1998 |
| EP | 0836904 A2 | 4/1998 |
| EP | 0892090 A1 | 1/1999 |
| EP | 0786017 B1 | 3/1999 |
| EP | 1306454 A1 | 5/2003 |
| EP | 1319729 A1 | 6/2003 |
| EP | 1204776 B1 | 6/2004 |
| JP | 63194884 A | 8/1988 |
| JP | 63224890 A | 9/1988 |
| JP | 7241692 A | 9/1995 |
| JP | 8001332 A | 1/1996 |
| JP | H08015481 | 1/1996 |
| JP | 8323473 A | 12/1996 |
| JP | 3164137 B2 | 5/2001 |
| JP | 2001287062 A | 10/2001 |
| JP | 3272853 B2 | 4/2002 |
| JP | 2008264841 A | 11/2008 |
| RU | 2109611 C1 | 4/1998 |
| RU | 2288082 C2 | 11/2006 |
| SU | 901304 A1 | 1/1982 |
| SU | 1122718 A1 | 11/1984 |
| WO | WO 9967435 A1 | 12/1999 |
| WO | WO 0044949 A1 | 8/2000 |

* cited by examiner

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | |
| IN 792 DS | 0.08 | 12.5 | Rem. | 9.0 | 1.9 | 4.1 | 4.1 | | 3.4 | 3.8 | 0.015 | 0.02 | 1.00 |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

Chemical composition in %

WELDING METHOD AND COMPONENT

CROSS REFERENCE TO RELATED APPLICATIONS

This application is the US National Stage of International Application No. PCT/EP2010/054322, filed Mar. 31, 2010 and claims the benefit thereof. The International Application claims the benefits of German application No. 10 2009 016 260.7 DE filed Apr. 3, 2009. All of the applications are incorporated by reference herein in their entirety.

FIELD OF INVENTION

The invention relates to a process for filling a recess of a component by welding and to a component.

BACKGROUND OF INVENTION

When repairing components by welding, it is often the case that recesses are also filled. These recesses are produced by the excavation of a damaged region which has arisen during operation of the component. For refurbishment, it is necessary to add material so as to achieve the geometry of the component and also a sufficient strength of the component. Depending on the weld filler, binding defects and cracks may repeatedly occur in the added material.

SUMMARY OF INVENTION

It is therefore an object of the invention to solve the above-mentioned problem.

The problem is solved by a process as claimed in the claims and by a component as claimed in the claims.

The dependent claims list further advantageous measures which can be combined with one another, as desired, in order to achieve further advantages.

BRIEF DESCRIPTION OF THE DRAWINGS

FIG. 16 is a list of superalloys.

The figures and the description represent only exemplary embodiments of the invention.

DETAILED DESCRIPTION OF INVENTION

Figure 1:
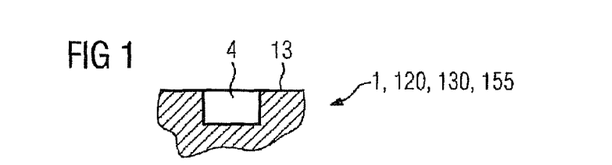
FIGS. 1-9 show filling strategies for the welding.

FIG. 1 shows a component 1, 120, 130, 155 having a recess 4 in the region of a surface 13.

Figure 15:
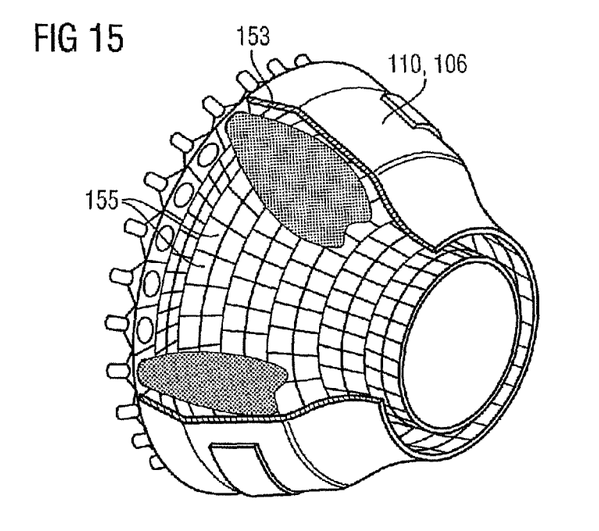
FIG. 15 shows a combustion chamber.

The component 1 is preferably a turbine blade or vane 120, 130 and preferably consists of a nickel-based or cobalt-based superalloy (FIG. 15).

The recess 4 is intended to be filled with welding material. The recess 4 is delimited by a contour 16 (a closed line) with respect to the outer surface 13.

Figure 5:
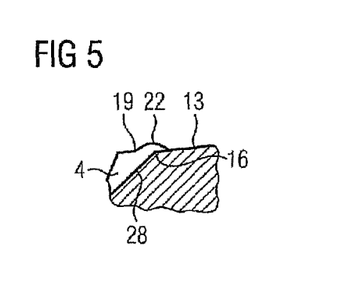

The recess 4 has flanks 28, which preferably run obliquely and not perpendicularly with respect to the surface 13 close to the contour 16 (FIG. 5). The flank angles (the angles between the flank 28 and the imaginary extension of the surface 13 over the recess 4) are preferably between 30° and 40°.

The recess 4 is preferably filled by build-up welding.

It is preferable to use a laser process as the welding process.

A welding layer I, II, III (FIGS. 8, 9) consists of a plurality of welding tracks 10', 10'', 10''', which result in a cohesive area. The welding tracks 10', 10'', 10''' for each welding layer I, II, III are preferably laid in a meandering foul). (FIGS. 2, 3, 4, 6, 7).

A main direction 25 of the welding tracks 10', 10'', 10''', . . . represents the longest extent 11 of a welding track 10', 10'', 10''' and is shown as an arrow in FIGS. 2, 3, 4, 6, 7 and 10.

However, the welding tracks 10', 10'', 10''', . . . overshoot the contour 16 of the recess 4 and therefore in part reach the surface 13 (FIGS. 2, 5, 6, 7, 8, 9). The welding track 10', 10'', . . . is preferably located both on the surface 13 of the component 1, 120, 130, 155 and also in the recess 4.

Figure 8:
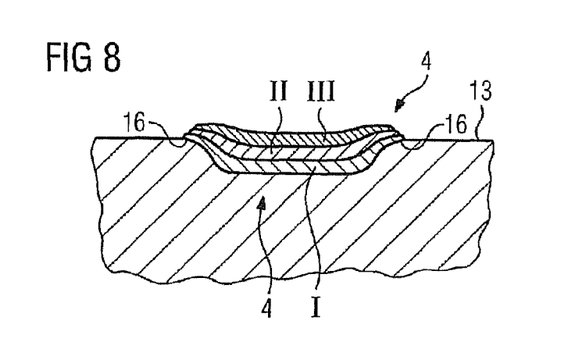
Figure 9:
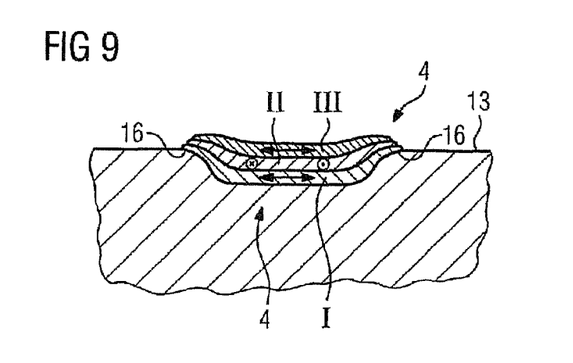

The cross section of such layers I, II, III laid one above another is shown in FIGS. 8, 9.

The hump 22 thereby produced (FIG. 5), which protrudes beyond the plane of the surface 13, is either left or subsequently ground down or removed by milling.

As a result of the deliberate overshooting, i.e. as a result of additional welding material in the region of the surface 13, good welding results are achieved and no cracks foam in the finish-welded component 1, 120, 130, 155. It is preferable that merely the welding material above the surface 13 has to be removed.

Figure 3:
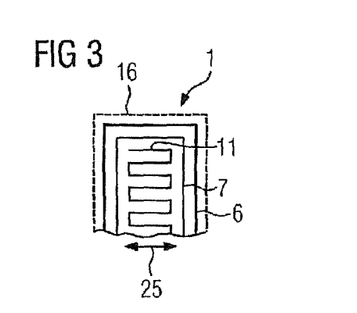

FIG. 3 shows a further filling strategy for welding. Here, a frame 6 is firstly placed within the recess 4, which 6 resembles the contour 16. If the recess 4 is rectangular, this frame 6 (=first welding track) is likewise rectangular.

Figure 6:
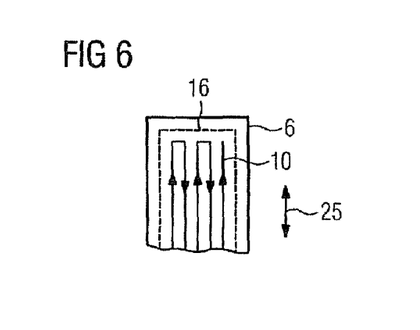
Figure 7:
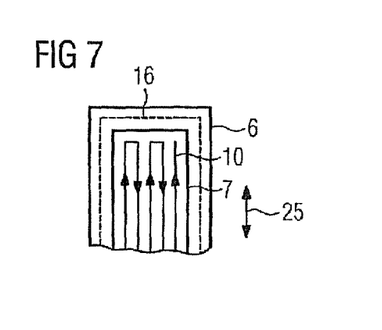

This first outer welding track 6 can lie within the contour 16 (FIGS. 3, 4) or on the surface 13 (FIGS. 6, 7). The welding track 6 (FIGS. 6, 7) preferably runs over the contour 16, i.e. on the surface 13 and in the recess 4.

Figure 4:
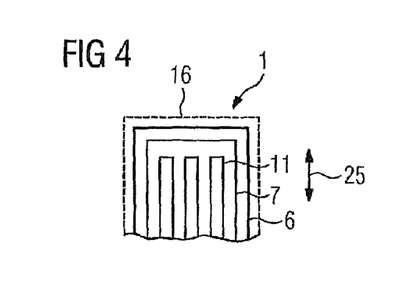

A further welding track 7 can preferably be laid, likewise corresponding to the outer contour of the recess 4 and lying within the first welding track 6 (FIGS. 4, 7).

A meandering progression of the welding track 10', 10'', . . . is then selected within the contour 6, 7 (FIGS. 3, 4, 6, 7). The orientation 25 of the longest part 11 of the zigzag curve can be oriented to the shortest width of the recess 4 (FIG. 3).

Similarly, the longest part 11 of the zigzag curve can run parallel to the longest orientation of the recess 16 (FIGS. 4, 6, 7). It is likewise possible for the orientation of the main direction 25 to be varied in layers (I, II, III) (not shown).

Recesses do not necessarily have to be filled. It is likewise possible for material to be applied areally to each surface (FIGS. 2, 3, 4, 6, 7). The contour 16 then represents the delimitation of the area to be coated.

FIG. 8 shows a cross section of the above filling strategy (FIG. 2) after welding.

The recess 4 is preferably covered completely by a first layer I of welding tracks (FIG. 2), i.e. the first welding layer I preferably also proceeds as far as the contour 16 and beyond it.

A second welding layer II is then applied, the end of which likewise protrudes beyond the surface 13.

The second welding layer II preferably covers the first welding layer I completely. This provision of layers one above another is continued until a last layer III preferably lies completely over a surface 13.

FIG. 9 shows a further filling strategy for welding, in particular a special embodiment with respect to FIG. 8.

Figure 2:
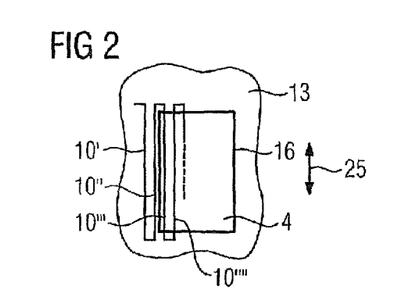

Here, a first welding layer I is laid by a plurality of welding tracks (10', 10'', 10''') with a main direction 25 parallel to the plane of the drawing (the orientation of 25 is arbitrary). The main direction 25 is the longest extent 11 of a welding track 10', 10'', . . . in the case of a meandering formation (FIG. 2).

The second welding layer II is laid with welding tracks in a main direction 25 which is different, preferably perpendicular, to the main direction 25 of the welding layer I, i.e. from the plane of the drawing, a main direction of the welding tracks 10', 10", . . . of the third welding layer III preferably running, in turn, like the first welding layer I.

Figure 10:
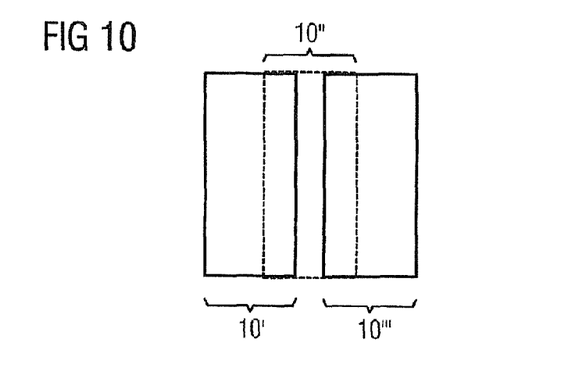
FIGS. 10-12 show procedures for heat treatment of a weld seam.

FIG. 10 also shows that the lines which represent the welding tracks in FIGS. 1 to 7 have a width. The welding tracks can overlap or merely adjoin one another; this also applies to FIGS. 1 to 7.

Figure 11:
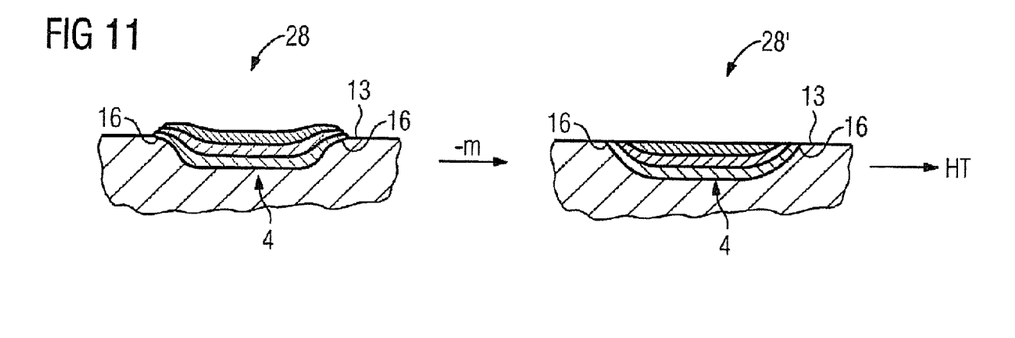
Figure 12:
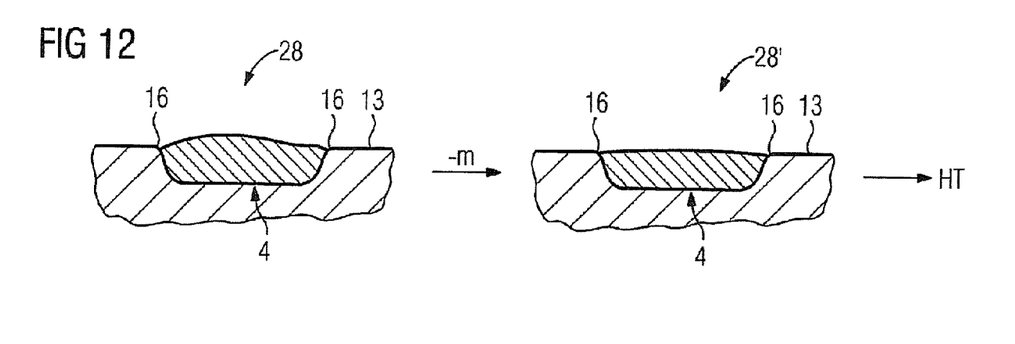

Procedures before the heat treatment of a weld seam 28 are shown on the left-hand side of FIGS. 11, 12.

Both the left-hand side of FIG. 11 and the left-hand side of FIG. 12 show weld seams/welding layers 28 which are produced by any desired process but also protrude beyond the outer original contour of the surface 13 of the substrate. As the next machining step, the weld seam is recontoured, i.e. the welding track/layer is smoothed and adapted to the height of the outer surface 13, i.e. material is removed (-m) in order to restore the original aerodynamic contour.

The last step is then the heat treatment (HT) with the weld seam 28, which is conventional depending on the material and the component.

Figure 13:
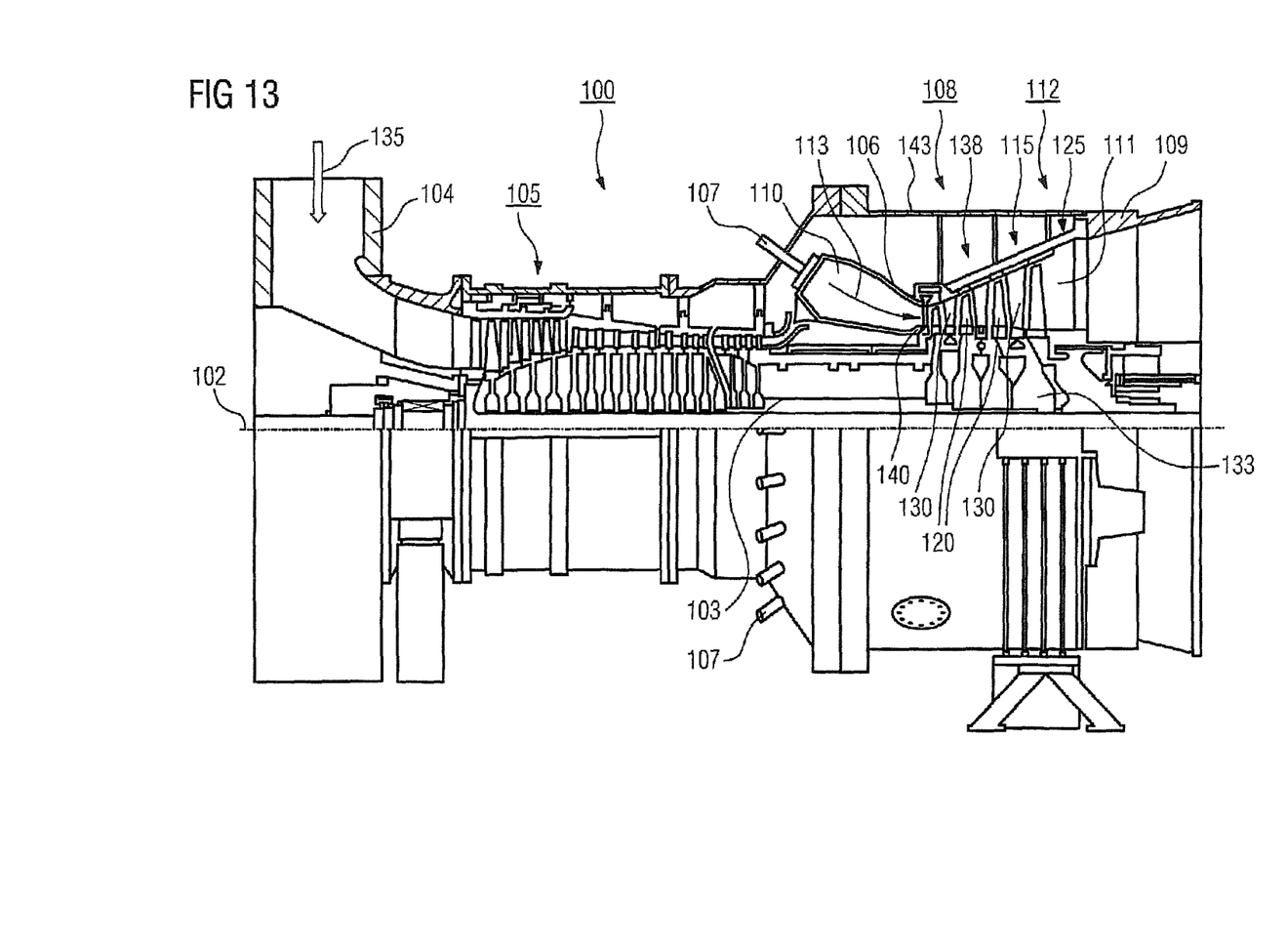
FIG. 13 shows a gas turbine.

FIG. 13 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal faun (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

It is also possible for a thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 14:
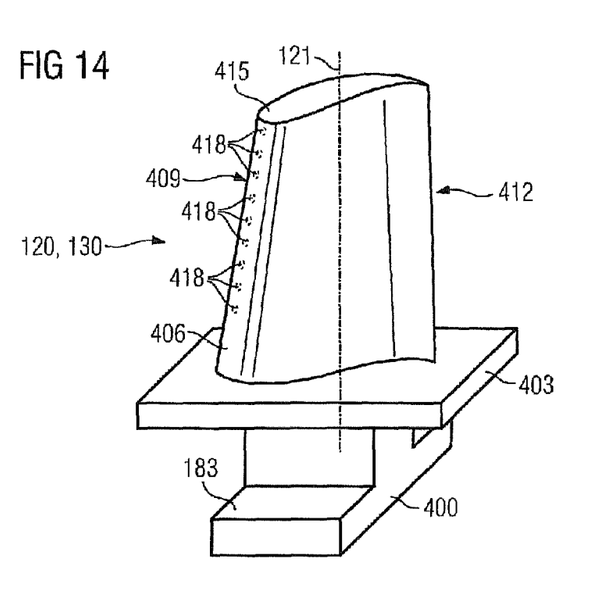
FIG. 14 shows a turbine blade or vane.

FIG. 14 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form.

If the blade or vane 120, 130 is to be cooled, it is hollow and may also have film-cooling holes 418 (indicated by dashed lines).

FIG. 15 shows a combustion chamber 110 of a gas turbine. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

The invention claimed is:

1. A process for welding a component in which a recess is filled by a plurality of welding tracks, comprising:
   providing the recess with a contour which delimits an outer upper surface of the component with respect to the recess;

laying the plurality of welding tracks such that the plurality of welding tracks also reach the outer upper surface outside the contour of the recess; and filling the recess using a plurality of welding layers until a last layer protrudes completely beyond the outer upper surface, wherein the recess is covered completely by a first layer of welding tracks, the first layer covers the recess and protrudes beyond the upper outer surface outside of the contour, and wherein the second layer covers the first layer inside the recess, the end of the second layer also protrudes beyond the upper outer surface outside of the contour, and wherein each successive layer covers the previous layer inside the recess, the end of each successive layer protrudes beyond the upper outer surface outside of the contour.

2. The process as claimed in claim 1, wherein a first welding track is laid such that a first shape thereof corresponds to a second shape of the contour.

3. The process as claimed in claim 2, wherein which a second welding track is produced within the first welding track, which corresponds to the contour.

4. The process as claimed in claim 3, wherein the recess is filled in meandering fashion within the first or second contour-based welding track.

5. The process as claimed in claim 1, wherein laser build-up welding is used.

6. The process as claimed in claim 1, wherein a main direction of the plurality of welding tracks of the individual plurality of welding layers lying one above another run at an angle of considerably greater than 0° to 90°.

7. The process as claimed in claim 6, wherein the main direction of the plurality of welding tracks of the individual plurality of welding layers lying one above another run at an angle perpendicularly with respect to one another.

8. The process as claimed in claim 1, wherein the plurality of welding tracks of a welding layer are laid in a meandering fashion.

9. The process as claimed in claim 1, wherein a plurality of further welding layers cover a direct predecessor respectfully, completely.

10. The process as claimed in claim 1, wherein a plurality of further welding layers cover a direct predecessor respectfully, partially.

11. The process as claimed in claim 1, wherein the recess includes a plurality of flanks which do not run perpendicularly with respect to the surface of the component.

12. A process for a heat treatment of a weld seam, comprising:
producing the weld seam according the process as claimed in claim 1,
wherein the weld seam is recontoured before heat treatment.

* * * * *